(12) United States Patent
Zhang et al.

(10) Patent No.: US 8,950,372 B2
(45) Date of Patent: Feb. 10, 2015

(54) STARTER MOTOR

(75) Inventors: Guo Ji Zhang, Shenzhen (CN); Jin Yun Gan, Hong Kong (CN); Li Sheng Liu, Shenzhen (CN); Yue Li, Hong Kong (CN)

(73) Assignee: Johnson Electric S.A., Murten (CH)

( * ) Notice: Subject to any disclaimer, the term of this patent is extended or adjusted under 35 U.S.C. 154(b) by 611 days.

(21) Appl. No.: 13/277,563

(22) Filed: Oct. 20, 2011

(65) Prior Publication Data

US 2012/0097124 A1    Apr. 26, 2012

(30) Foreign Application Priority Data

Oct. 20, 2010    (CN) .......................... 2010 1 0515070

(51) Int. Cl.
*F02N 11/00*    (2006.01)
*F02N 15/00*    (2006.01)
*H02K 7/14*    (2006.01)

(52) U.S. Cl.
CPC .............. *F02N 11/00* (2013.01); *F02N 15/006* (2013.01); *H02K 7/14* (2013.01); *F02D 2400/06* (2013.01)
USPC ............. 123/179.28; 123/149 D; 123/179.25; 290/22; 290/27; 290/31; 290/36 R; 290/46; 310/70 R; 310/153

(58) Field of Classification Search
CPC ......... F02N 11/04; F02N 11/14; F02N 11/06; H02K 7/1815; B60K 6/48; B60W 10/06; B60W 10/08; Y02T 10/6221
USPC ............. 123/179.1, 179.25, 179.26, 179.22, 123/179.28, 179.29; 293/10, 22, 23, 30 R, 293/31–33, 36 R, 37 R, 38 B, 38 R, 46–48; 310/153, 154.01
See application file for complete search history.

(56) References Cited

U.S. PATENT DOCUMENTS

| | | | | |
|---|---|---|---|---|
| 2,932,447 | A * | 4/1960 | Phelon | 416/60 |
| 3,732,483 | A * | 5/1973 | Katsumata | 322/91 |
| 4,160,435 | A * | 7/1979 | Sleder | 123/599 |
| 4,180,743 | A * | 12/1979 | Lacroix | 290/38 B |
| 4,473,752 | A * | 9/1984 | Cronin | 290/38 R |
| 4,626,696 | A * | 12/1986 | Maucher et al. | 290/38 R |
| 4,720,638 | A * | 1/1988 | Vollbrecht | 290/38 R |
| 4,862,009 | A * | 8/1989 | King | 290/22 |
| 5,164,623 | A * | 11/1992 | Shkondin | 310/67 R |
| 5,621,261 | A * | 4/1997 | Winter | 310/168 |
| 6,073,713 | A * | 6/2000 | Brandenburg et al. | 180/65.22 |
| 6,232,691 | B1 * | 5/2001 | Anderson | 310/179 |
| 6,242,828 | B1 * | 6/2001 | Rose, Sr. | 310/74 |
| 6,369,532 | B2 * | 4/2002 | Koenen et al. | 318/150 |
| 6,794,776 | B1 * | 9/2004 | Gabrys | 310/74 |
| 6,838,797 | B2 * | 1/2005 | Du | 310/154.28 |
| 6,948,299 | B2 * | 9/2005 | Osborne | 56/10.8 |
| 6,975,054 | B2 * | 12/2005 | Shkondin | 310/148 |
| 6,995,477 | B2 * | 2/2006 | Fan | 290/1 A |
| 7,239,032 | B1 * | 7/2007 | Wilson et al. | 290/36 R |
| 7,400,053 | B2 * | 7/2008 | Wilson et al. | 290/36 R |
| 2004/0135373 | A1 * | 7/2004 | Osborne | 290/1 A |

* cited by examiner

*Primary Examiner* — Erick Solis
*Assistant Examiner* — Carl Staubach
(74) *Attorney, Agent, or Firm* — Muncy, Geissler, Olds & Lowe, P.C.

(57) ABSTRACT

A starter motor for engine has a flywheel fixed to a shaft of the engine. A support is fixed relative to the engine. A space is formed between the flywheel and the support and a driving device is installed in the space. The driving device includes a stator fixed to the support and a rotor fixed to the flywheel.

8 Claims, 4 Drawing Sheets

STARTER MOTOR

CROSS REFERENCE TO RELATED APPLICATIONS

This non-provisional patent application claims priority under 35 U.S.C. §119(a) from Patent Application No. 201010515070.2 filed in The People's Republic of China on Oct. 20, 2010.

FIELD OF THE INVENTION

This invention relates to a starter motor for an internal combustion engine and in particular, to a starter motor for an engine of a lawn mower or the like.

BACKGROUND OF THE INVENTION

FIG. 8 shows a traditional starter motor for an engine of a lawn mower. The starter motor comprises an electric motor 1, a reduction gearbox 2 connected to a shaft of the motor 1, an output shaft 3 of the gearbox 2, and a pinion 4 mounted on the output shaft 3. When the motor 1 is operated, the output shaft 3 is rotated to thereby drive the pinion 4. The pinion illustrated is an inertia type pinion which relies on the inertia of the pinion and a helical spline connection between the output shaft and the pinion to move the pinion axially along the output shaft 3 to engage a flywheel 5 of the engine 6 when the starter motor is turned on. Consequently, the flywheel 5 and the engine shaft 7 to which the flywheel is fixed are rotated to thereby start the engine 6. After the engine 6 starts, the speed of the flywheel 5 will increase and the pinion 4 will disengage from the flywheel 5. The flywheel 5 has an induction magnet installed at the outer surface thereof. An induction coil 9 is located near the flywheel 5 for cooperating with the induction magnet to generate power for an ignition system. A fan 8 may be formed on the flywheel to provide cooling for the engine.

However, the above starter motor comprises a motor, gearbox and pinion installed outside of the flywheel where it is vulnerable to external damage. The starter motor has a complicated structure and occupies space.

SUMMARY OF THE INVENTION

Hence there is a desire for a starter motor with a simple structure.

Accordingly, in one aspect thereof, the present invention provides a starter motor for an internal combustion engine, comprising: a flywheel fixed to a shaft of the engine; a support fixed relative to the engine, a space being formed between the flywheel and the support; and a driving device installed in the space, the driving device comprising a stator fixed to the support and a rotor fixed to the flywheel.

Preferably, the starter motor further comprises an induction magnet fixed to one of the stator and rotor, and an induction coil near the induction magnet fixed to the other of the stator and rotor.

Preferably, the flywheel comprises an end wall and a cylindrical side wall extending from a periphery of the end wall, the space being formed between the end wall, the side wall, and the support.

Preferably, a plurality of blades is arranged at an outer surface of the end wall of the flywheel.

Preferably, the rotor comprises a magnet fixed to an inner surface of the side wall of the flywheel, and the stator comprises a winding facing the magnet of the rotor.

Preferably, the flywheel is of magnetically non-conductive material and the magnet is fixed to the side wall of the flywheel via a flux ring.

Alternatively, the drive device has a squirrel cage induction motor structure with a rotor core fixed to an inner surface of the side wall of the flywheel, the rotor core supporting a squirrel cage conductor, and the stator comprises a winding facing the squirrel cage conductor of the rotor.

Alternatively, the rotor comprises a rotor core made of magnetically conductive material and fixed on an inner surface of the side wall of the flywheel, the rotor core comprises a plurality of teeth extending inwardly there from, and the stator comprises a winding facing the teeth of the rotor.

Alternatively, the support comprises a cylindrical side wall and an inner wall, and the flywheel comprises an end wall, the space being formed between the end wall and inner wall of the support and the end wall of the flywheel.

Preferably, the stator comprises a magnet fixed to the outer surface of the inner wall, and the rotor comprises a winding fixed to the end wall of the flywheel, the winding being located between the side wall and the inner wall of the support with a small air gap formed there between.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
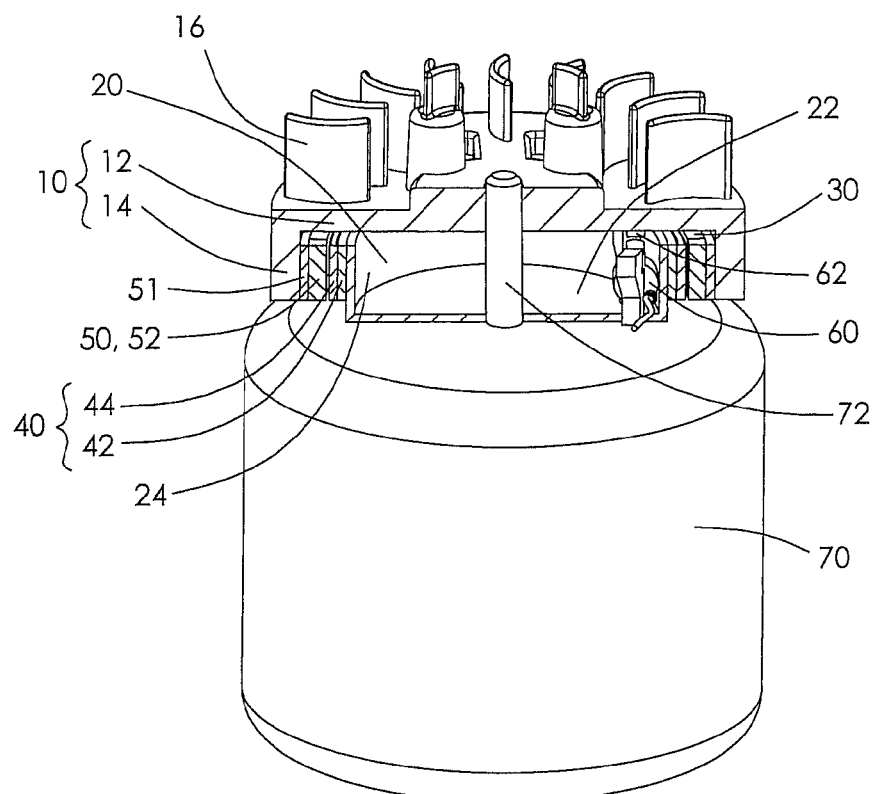
FIG. 1 is a partial sectional view of an engine and starter motor in accordance with a first embodiment of the present invention.
Figure 2:
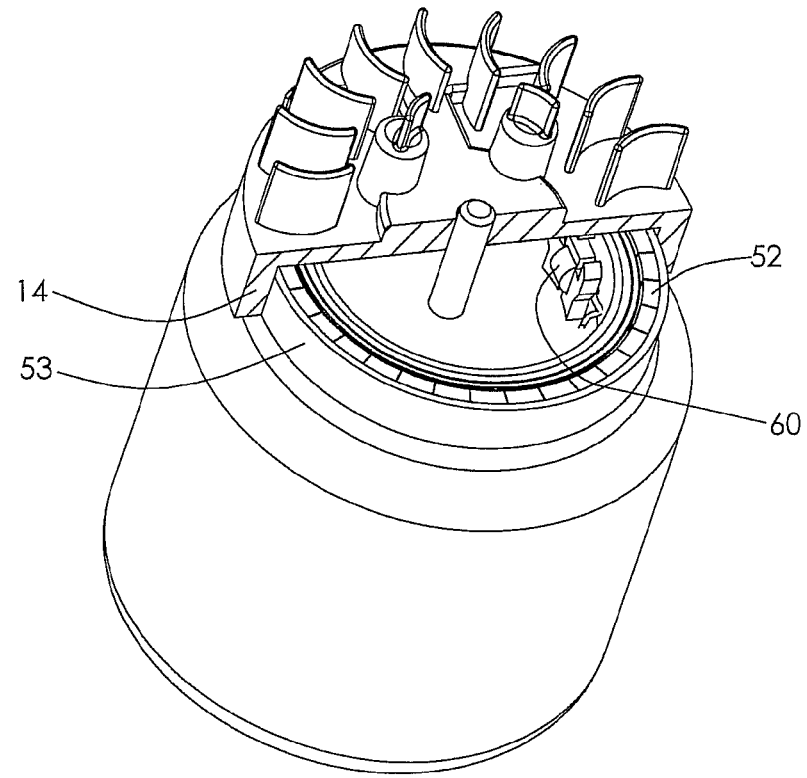
FIG. 2 is a partially cutaway, isometric view of the engine and starter motor of FIG. 1.

FIGS. 1 and 2 illustrate a starter motor for an engine according to a first preferred embodiment of the present invention. The starter motor comprises a flywheel 10 fixed to a shaft 72 of the engine 70, and a support 20 fixed relative to the engine 70. A space 30 is formed between the flywheel 10 and the support 20. A driving device is installed in the space 30. The driving device comprises a stator 40 fixed to the support 20 and a rotor 50 fixed to the flywheel 10.

The flywheel 10 comprises an end wall 12 and a cylindrical side wall 14 extending from a periphery of the end wall 12. The end wall 12 is fixed to the shaft 72 of the engine 70. A plurality of blades 16 is arranged on the outer surface of the end wall 12 of the flywheel 10, for generating airflow when the rotor 50 is rotated, to cool components near the starter motor. The support 20 comprises an end wall 22 fixed to the engine 70 and a side wall 24 extending from a periphery of the end wall 22 toward the end wall 12 of the flywheel 10. The space 30 is formed between the end wall 12, the side wall 14, and the side wall 24 of the support 20.

The stator 40 comprises a stator core 42 fixed on the outer surface of the side wall 24 of the support 20, and a winding 44 wound on the stator core 42.

The rotor 50 comprises a magnet 52 fixed on the inner surface of the side wall 14 of the flywheel 10. The magnet 52 faces the winding 44 with a small air gap formed there between to allow the rotor 50 to rotate around the stator 40.

The starter motor further comprises an ignition induction coil 60 installed on the inner surface of the end wall 22 of the support 20, and an ignition induction magnet 62 which cooperates with the induction coil 60, fixed to the inner surface of the end wall 12 of the flywheel 10.

Preferably, the flywheel 10 is made of magnetically conductive material. Alternatively, the flywheel 10 may be made of non-magnetically conductive material and a magnetic flux ring forming a flux return path for the magnet 52 may be fixed to the inner surface of the side wall of the flywheel 10 and the magnet 52 is fixed to the inner surface of the magnetic flux return ring. The magnet 52 may be a single piece magnet or may be formed from a number of pieces of permanent magnet.

In operation, the stator winding 44 is electrified. The rotor 50 with the flywheel 10 is rotated under coactions between the stator winding 44 and the rotor magnet 52. Consequently, the shaft 72 of the engine 70 is rotated and the induction magnet 62 is rotated to cause the induction coil 60 to generate power for engine ignition. Thus, the engine is started.

In the present invention, the rotor 50 of the driving device is directly fixed/connected/integrated with the flywheel 10 of the engine 70. The gearbox and pinion used in the prior art starter motor are omitted. Furthermore, the driving device comprising the magnet 52 and winding 44 are received in the space 30 formed between the flywheel 10 and the support 20. Thus, the starter motor is well protected from accidental damage.

In the above embodiment, the magnet 52 faces the winding 44 with a radial gap formed there between. Alternatively, the magnet 52 and the winding 44 may be arranged such that an axial gap is formed there between.

Figure 3:
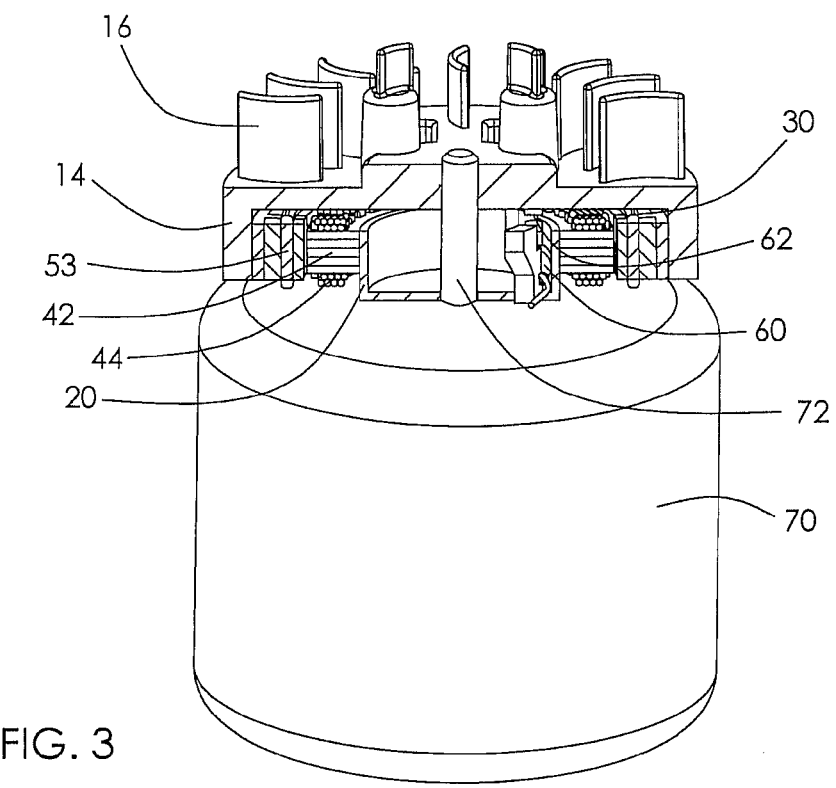
FIG. 3 is a partial sectional view of an engine and starter motor in accordance with a second embodiment of the present invention.
Figure 4:
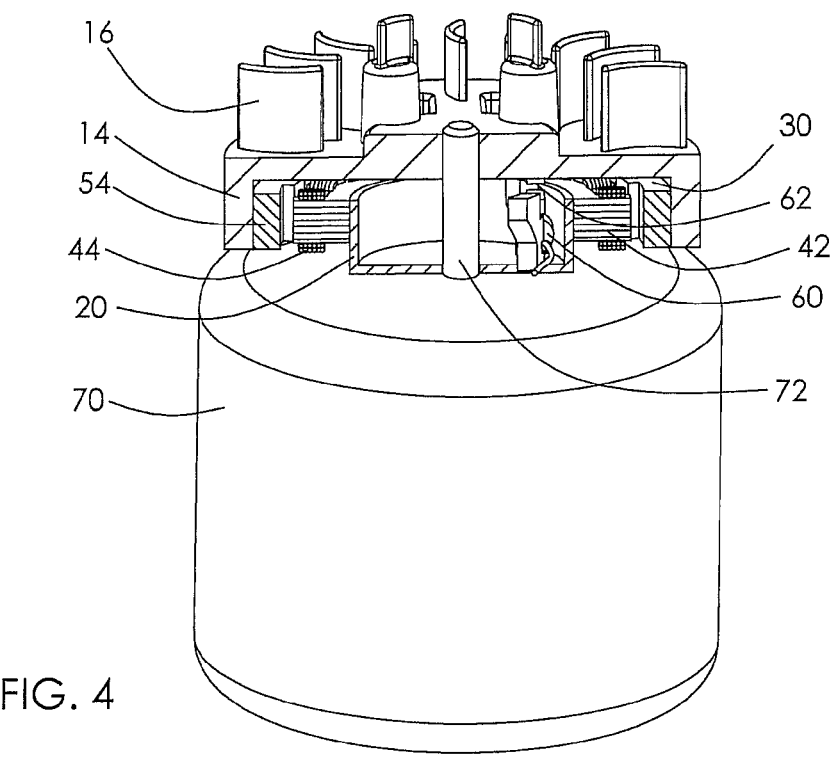
FIG. 4 is a partial sectional view of an engine and starter motor in accordance with a third embodiment of the present invention.
Figure 5:
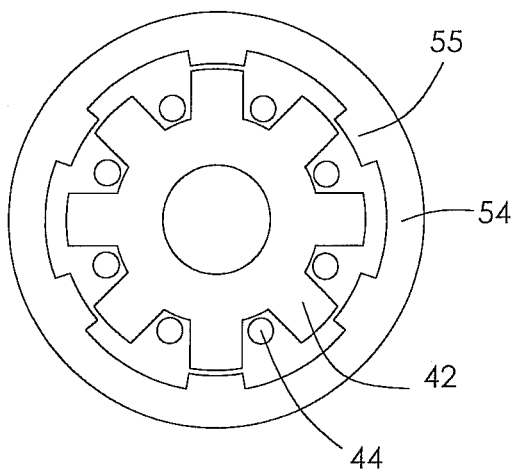
FIG. 5 is a cross sectional view of a driving device being a part of the starter motor of FIG. 4.

FIG. 3 shows a starter motor of a second embodiment of the present invention. This starter motor is similar to the starter motor of the first embodiment except for the rotor. This starter motor adopts a squirrel cage induction motor structure. The rotor comprises a squirrel cage conductor structure 53 facing the stator winding 44. The conductor structure 53 is fixed to the inner surface of the side wall 14 of the flywheel 10. The rotor of this embodiment does not use a permanent magnet and no core loss is generated when the engine rotates and the current of the stator winding 44 is cut off FIGS. 4 and 5 show a starter motor of a third embodiment of the present invention. This starter motor adopts a SR (switched reluctance) motor structure. The rotor comprises a rotor core 54 fixed on the inner surface of the side wall 14 of the flywheel 10. The rotor core 54 comprises a plurality of teeth 55 extending inwardly there from. The teeth 55 face the stator winding 44. The rotor of this embodiment does not use a permanent magnet and no core loss is generated when the engine rotates and the current of the stator winding 44 is cut off.

Figure 6:
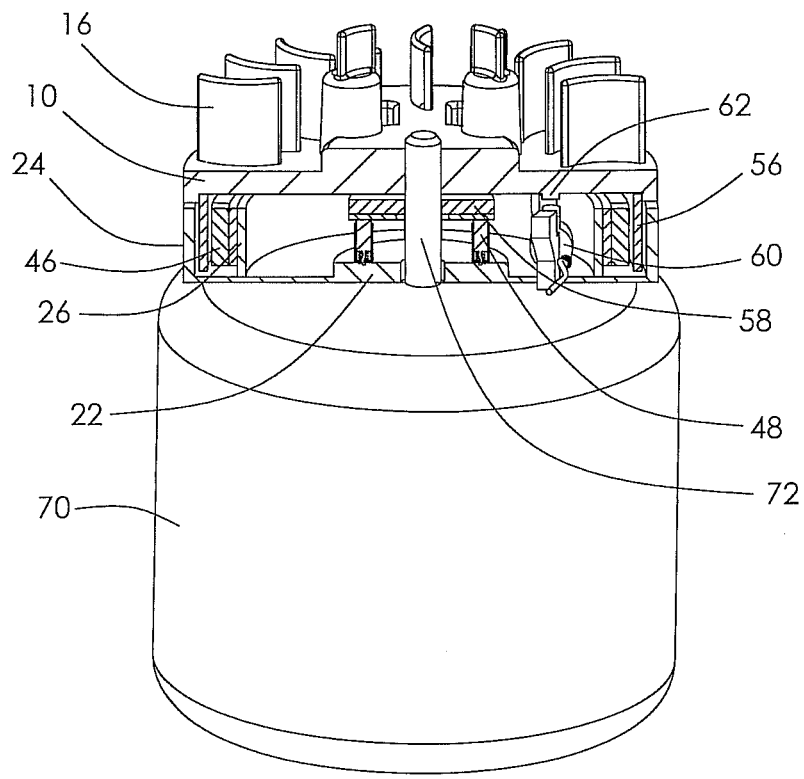
FIG. 6 is a partial sectional view of an engine and starter motor in accordance with a fourth embodiment of the present invention.
Figure 7:
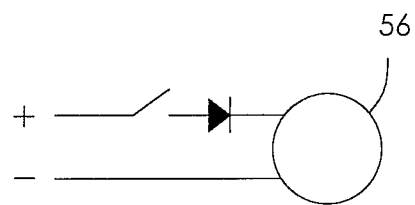
FIG. 7 illustrates a circuit for preventing induced current flowing from the starter motor to the power source.
Figure 8:
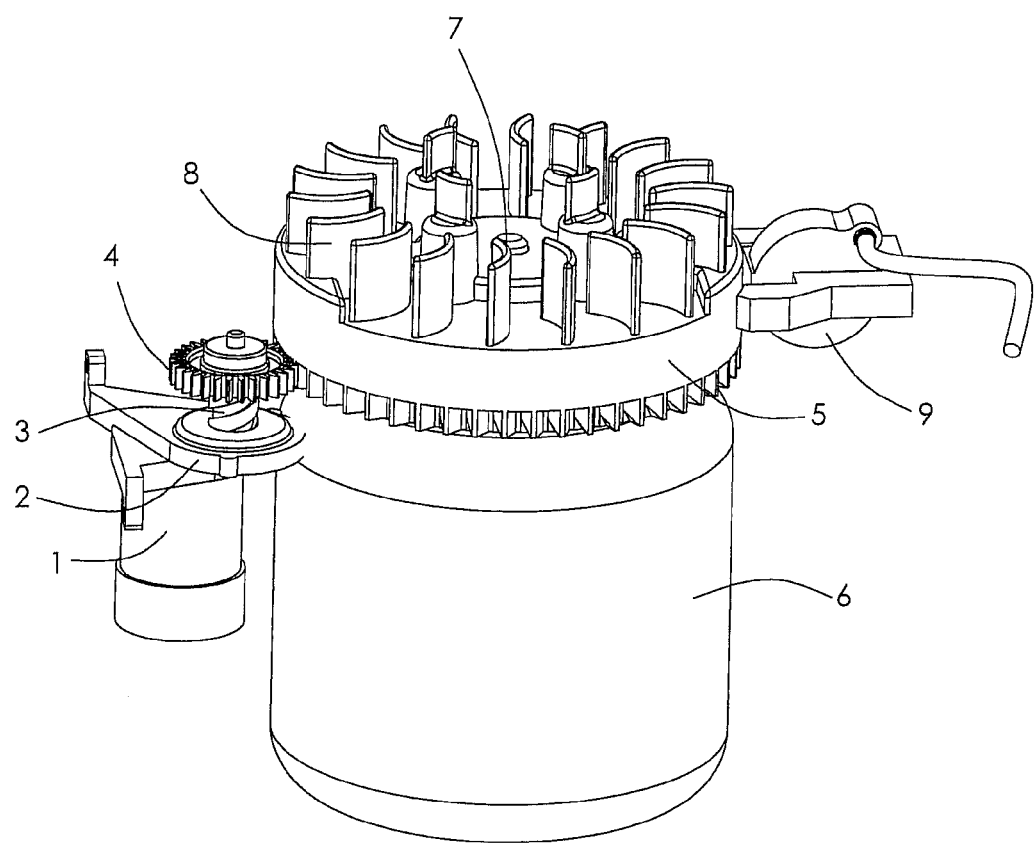
FIG. 8 illustrates an engine and with a traditional starter motor.

FIGS. 6 and 7 show a starter motor of a fourth embodiment of the present invention. This starter motor adopts a coreless direct current motor structure. The support 20 comprises a side wall 24 and an inner wall 26. The stator 40 comprises a magnet 46 fixed on the outer surface of the inner wall 26. The rotor comprises rotor windings 56 fixed on the inner surface of the side wall 14 of the flywheel 10. The windings 56 are located between the magnet 46 and side wall 24 of the support 20 with a small air gap formed there between. The motor further comprises a commutator 58 fixed to the shaft 72 of the engine 70, or the inner surface of the end wall 12 of the flywheel, and electrically connected to the rotor windings 56. Brushes 48 are installed on the end wall of the support 20 for slidably contacting with the commutator 58 to thereby feed power from a power source to the rotor windings 56. A diode may be arranged between the power source and the starter motor to prevent current generated in the rotor windings 56 due to rotation of the rotor, unintentionally flowing to the power source, as shown schematically in FIG. 7.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A starter motor for an internal combustion engine, comprising:
    a flywheel fixed to a shaft of the engine, the flywheel comprises an end wall and a cylindrical side wall extending from a periphery of the end wall;
    a support fixed relative to the engine, the support comprising an end wall fixed to the engine and a side wall extending from a periphery of the end wall, a space being formed between the end wall of the flywheel, the side wall of flywheel and the side wall of the support;
    a driving device installed in the space, the driving device comprising a stator fixed to the support and a rotor fixed to the flywheel;
    an induction magnet fixed to an inner surface of the end wall of the flywheel; and
    an induction coil near the induction magnet fixed to the support, the induction coil located inside the side wall of the support and the stator located outside the side wall of the support.

2. The starter motor of claim 1, wherein a plurality of blades is arranged at an outer surface of the end wall of the flywheel.

3. The starter motor of claim 1, wherein the rotor comprises a magnet fixed to an inner surface of the side wall of the flywheel, and the stator comprises a winding facing the magnet of the rotor.

4. The starter motor of claim 3, wherein the flywheel is of magnetically non-conductive material and the magnet is fixed to the side wall of the flywheel via a flux ring.

5. The starter motor of claim 1, wherein the drive device has a squirrel cage induction motor structure with a rotor core fixed to an inner surface of the side wall of the flywheel, the rotor core supporting a squirrel cage conductor, and the stator comprises a winding facing the squirrel cage conductor of the rotor.

6. The starter motor of claim 1, wherein the rotor comprises a rotor core made of magnetically conductive material and fixed on an inner surface of the side wall of the flywheel, the rotor core comprises a plurality of teeth extending inwardly there from, and the stator comprises a winding facing the teeth of the rotor.

7. The starter motor of claim 1, wherein the support comprises a cylindrical side wall and an inner wall, and the flywheel comprises an end wall, the space being formed between the end wall and inner wall of the support and the end wall of the flywheel.

8. The starter motor of claim 7, wherein the stator comprises a magnet fixed to the outer surface of the inner wall, and the rotor comprises a winding fixed to the end wall of the flywheel, the winding being located between the side wall and the inner wall of the support with a small air gap formed there between.

* * * * *